US010521662B2

(12) United States Patent
Shenouda Dawoud

(10) Patent No.: US 10,521,662 B2
(45) Date of Patent: Dec. 31, 2019

(54) UNGUIDED PASSIVE BIOMETRIC ENROLLMENT

(71) Applicant: Microsoft Technology Licensing, LLC, Redmond, WA (US)

(72) Inventor: Peter Dawoud Shenouda Dawoud, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/870,452

(22) Filed: Jan. 12, 2018

(65) Prior Publication Data

US 2019/0220662 A1 Jul. 18, 2019

(51) Int. Cl.
*G06K 9/00* (2006.01)
*G02B 27/01* (2006.01)
*G06F 3/01* (2006.01)
*G06F 3/0481* (2013.01)

(52) U.S. Cl.
CPC ..... *G06K 9/00617* (2013.01); *G02B 27/0172* (2013.01); *G06F 3/011* (2013.01); *G06F 3/04815* (2013.01); *G06K 9/0061* (2013.01); *G06K 9/00604* (2013.01); *G06K 9/00912* (2013.01); *G06K 9/00926* (2013.01); *G06K 9/00288* (2013.01)

(58) Field of Classification Search
CPC ..... G06F 19/00; G06F 3/04815; G06T 15/20; G06K 9/00617
See application file for complete search history.

(56) References Cited

U.S. PATENT DOCUMENTS 5,600,776 A * 2/1997 Johnson ............... G06F 9/451
715/733
6,766,040 B1 7/2004 Catalano et al.
6,970,584 B2 11/2005 O'Gorman et al.
(Continued)

FOREIGN PATENT DOCUMENTS

CN 101694691 A 4/2010
CN 103020174 A 4/2013
WO 0205077 A2 1/2002

OTHER PUBLICATIONS

Sae-Bae, et al., "Biometric-Rich Gestures: A Novel Approach to Authentication on Multi-touch Devices", In Proceedings of the SIGCHI Conference on Human Factors in Computing Systems, May 5, 2012, pp. 977-986.
(Continued)

*Primary Examiner* — Chan S Park
*Assistant Examiner* — Mai H Tran
(74) *Attorney, Agent, or Firm* — Arent Fox LLP

(57) ABSTRACT

Apparatus and methods of passive biometric enrollment are configured to provide an introductory experience upon activation of a computer device. The introductory experience involves a user performing movements that allow collection of passive user biometrics by a sensor of the device. The sensor may collect the passive user biometrics while the user performs the movements. The computer device may calibrate one or more features of the computer device based on the movements. The computer device may receive user credentials from the user. The computer device may store a biometric profile including the passive user biometrics in association with the user credentials.

14 Claims, 6 Drawing Sheets

(56) References Cited

U.S. PATENT DOCUMENTS

| | | | |
|---|---|---|---|
| 7,079,007 B2* | 7/2006 | Siegel | G07C 9/00087 |
| | | | 235/379 |
| 7,218,202 B2 | 5/2007 | Bacchiaz et al. | |
| 7,616,784 B2 | 11/2009 | Kocher | |
| 7,616,787 B2 | 11/2009 | Boshra | |
| 7,689,832 B2 | 3/2010 | Talmor et al. | |
| 7,856,248 B1* | 12/2010 | Fujisaki | H04M 1/575 |
| | | | 455/556.1 |
| 7,948,361 B2 | 5/2011 | Bennett et al. | |
| 8,150,108 B2 | 4/2012 | Miller | |
| 8,325,994 B2 | 12/2012 | Davida | |
| 8,368,510 B2 | 2/2013 | Luckhardt | |
| 8,856,541 B1 | 10/2014 | Chaudhury et al. | |
| 9,158,410 B2* | 10/2015 | Hare | G06F 3/0416 |
| 9,330,513 B2 | 5/2016 | Soni et al. | |
| 9,571,822 B2* | 2/2017 | Tao | G09G 3/006 |
| 9,600,709 B2* | 3/2017 | Russo | G06K 9/00087 |
| 9,672,408 B2* | 6/2017 | Johansson | G06K 9/00033 |
| 9,686,274 B2* | 6/2017 | Soni | H04L 63/0861 |
| 9,782,069 B2* | 10/2017 | Bellamy | A61B 3/113 |
| 10,073,518 B2* | 9/2018 | Rahman | G06F 3/013 |
| 2003/0101349 A1 | 5/2003 | Wang | |
| 2003/0182119 A1 | 9/2003 | Junqua et al. | |
| 2004/0230843 A1 | 11/2004 | Jansen | |
| 2005/0187883 A1 | 8/2005 | Bishop et al. | |
| 2005/0253683 A1 | 11/2005 | Lowe | |
| 2006/0288234 A1 | 12/2006 | Azar et al. | |
| 2007/0057763 A1 | 3/2007 | Blattner et al. | |
| 2008/0019573 A1 | 1/2008 | Baltatu et al. | |
| 2008/0175445 A1 | 7/2008 | Hu et al. | |
| 2010/0041374 A1 | 2/2010 | Vishik et al. | |
| 2010/0162386 A1 | 6/2010 | Li et al. | |
| 2011/0083170 A1* | 4/2011 | Kesanupalli | G06Q 20/10 |
| | | | 726/5 |
| 2011/0221567 A1 | 9/2011 | Lehnert et al. | |
| 2012/0019379 A1 | 1/2012 | Ben Ayed | |
| 2012/0095763 A1 | 4/2012 | Kuppuswamy et al. | |
| 2012/0159599 A1 | 6/2012 | Szoke et al. | |
| 2012/0200667 A1* | 8/2012 | Gay | A63F 13/52 |
| | | | 348/43 |
| 2012/0253953 A1 | 10/2012 | Aziz et al. | |
| 2012/0268241 A1 | 10/2012 | Hanna et al. | |
| 2012/0290870 A1 | 11/2012 | Shah et al. | |
| 2012/0293642 A1* | 11/2012 | Berini | G06F 21/32 |
| | | | 348/77 |
| 2013/0133055 A1 | 5/2013 | Ali et al. | |
| 2013/0185790 A1 | 7/2013 | Mckeeth | |
| 2013/0191908 A1* | 7/2013 | Klein | G06F 21/36 |
| | | | 726/18 |
| 2013/0272586 A1 | 10/2013 | Russo | |
| 2014/0003681 A1* | 1/2014 | Wright | G06K 9/00013 |
| | | | 382/124 |
| 2014/0013405 A1 | 1/2014 | White | |
| 2014/0063060 A1* | 3/2014 | Maciocci | G06F 3/011 |
| | | | 345/633 |
| 2014/0123224 A1 | 5/2014 | Nosrati | |
| 2014/0226131 A1 | 8/2014 | Lopez et al. | |
| 2014/0273963 A1 | 9/2014 | Su et al. | |
| 2014/0282646 A1* | 9/2014 | McCoy | G06K 9/00597 |
| | | | 725/12 |
| 2015/0036896 A1* | 2/2015 | Zhou | G06K 9/00067 |
| | | | 382/124 |
| 2015/0106891 A1 | 4/2015 | Soni et al. | |
| 2015/0294149 A1 | 10/2015 | Palti-wasserman et al. | |
| 2015/0331485 A1 | 11/2015 | Wilairat et al. | |
| 2016/0026253 A1* | 1/2016 | Bradski | G02B 27/225 |
| | | | 345/8 |
| 2016/0149905 A1 | 5/2016 | Wang et al. | |
| 2016/0342782 A1* | 11/2016 | Mullins | G06F 21/32 |
| 2016/0364610 A1* | 12/2016 | Jung | G06K 9/00617 |
| 2016/0364881 A1* | 12/2016 | Mallinson | G06T 7/20 |
| 2017/0091548 A1 | 3/2017 | Agrawal et al. | |
| 2017/0109513 A1 | 4/2017 | Skogo et al. | |
| 2017/0172675 A1* | 6/2017 | Jarc | A61B 90/361 |
| 2017/0205875 A1 | 7/2017 | Kaehler | |
| 2017/0295014 A1* | 10/2017 | Baras | G06K 9/00006 |
| 2017/0325675 A1* | 11/2017 | Liu | A61B 3/0041 |
| 2018/0114298 A1* | 4/2018 | Malaika | G02B 27/0093 |
| 2018/0232056 A1* | 8/2018 | Nigam | G06F 3/167 |

OTHER PUBLICATIONS

"International Search Report and Written Opinion Issued in PCT Application No. PCT/US18/066625", dated Mar. 28, 2019, 13 pages.

"BioPassword Whitepaper", Retrieved From: https://web.archive.org/web/20170830072246/http://www.infosecurityproductsguide.com/technology/2007/BioPassword_Authentication_Solutions_Whitepaper_FINAL.pdf, Jan. 1, 2006, 11 Pages.

"D712 Behavioural Biometric Profiling and Transparency Enhancing Tools", Retrieved From: http://www.fidis.net/fileadmin/fidis/deliverables/fidis-wp7-de17.12_behavioural-biometric_profiling_and_transparency_enhancing_tools.pdf, Mar. 4, 2009, 12 Pages.

"Windows Biometric Framework Overview", Retrieved From: http://technet.microsoft.com/en-us/library/hh831396.aspx, Feb. 29, 2012, 8 Pages.

"Final Office Action Issued in U.S. Appl. No. 14/052,682", dated Jan. 29, 2016, 11 Pages.

"Non Final Office Action Issued in U.S. Appl. No. 14/052,682", dated Nov. 7, 2014, 10 Pages.

"Non Final Office Action Issued in U.S. Appl. No. 14/052,682", dated Jun. 30, 2015, 11 Pages.

"Non Final Office Action Issued in U.S. Appl. No. 14/052,682", dated Jul. 18, 2016, 11 Pages.

"First Office Action Issued in Chinese Patent Application No. 201480055993.0", dated Feb. 23, 2018, 15 Pages.

"Second Office Action Issued in Chinese Patent Application No. 201480055993.0", dated Oct. 16, 2018, 12 Pages.

"International Search Report and Written Opinion for PCT Patent Application No. PCT/US2014/059582", dated Jan. 28, 2015, 10 Pages.

"Second Written Opinion Issued in PCT Application No. PCT/US2014/059582", dated Sep. 14, 2015, 7 Pages.

Prabhakar, et al., "Biometric Recognition: Security and Privacy Concerns", In the Journal of IEEE Security and Privacy, vol. 1, Issue 2, Mar. 2003, 10 pages.

Uludag, et al., "Biometric Template Selection and Update: A Case Study in Fingerprints", In Pattern Recognition, vol. 37, Issue 7, Jul. 2004, pp. 1533-1542.

* cited by examiner

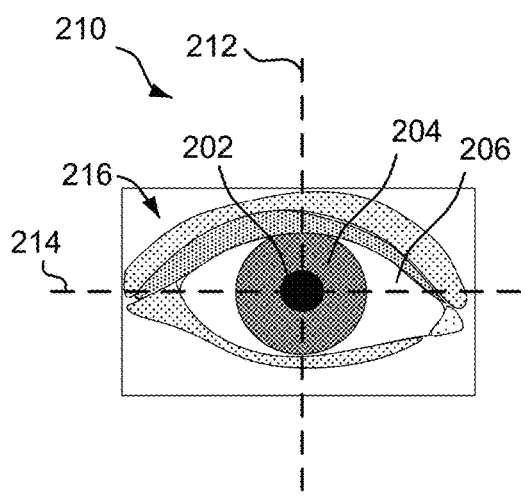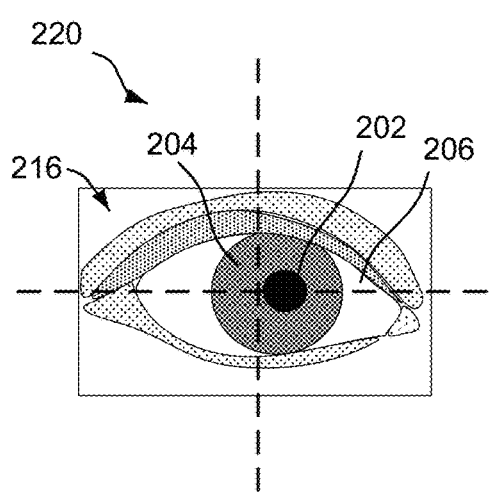
*FIG. 2A*  *FIG. 2B*

UNGUIDED PASSIVE BIOMETRIC ENROLLMENT

BACKGROUND

The present disclosure relates to biometric identification, and more particularly, to an apparatus and method of enrolling a user of a device in biometric identification using passive sensors.

Within the field of computing, many scenarios involve an identification of an individual using one or more biometrics. Typically, users are asked to provide consent to the collection of a biometric profile. When the user consents, the device provides an active enrollment experience in which the user is prompted to interact with a biometric scanner in a particular manner. The device generates a biometric profile of the user based on the interactions with the biometric scanner. The biometric profile is then stored in association with the user's credentials, and can be used for performing various operations such as identification.

A passive biometric identification uses a sensor with which the user does not directly interact. In one example, for instance, iris recognition is considered as one of the most secure forms of biometric authentication and verification. With cameras becoming smaller, products are now available in the market that use iris recognition as a primary mode of authentication to secure all the data on the device they intend to protect. An iris scanning camera is an example of a passive biometric sensor in that the user does not directly interact with the camera. An explicit enrollment procedure for passive biometric identification may be awkward for a user, especially during an out of box experience when the user is first interacting with the device.

Thus, there is a desire for improvements in the field of identification of an individual using one or more biometrics.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

In one example, a method of enrolling user biometrics for a device includes providing an introductory experience upon activation of the device, wherein the introductory experience involves a user performing movements that allow collection of passive user biometrics by a sensor of the device. The method may include collecting the passive user biometrics while the user performs the movements. The method may include calibrating the device based on the movements. The method may include receiving user credentials from the user. The method may include storing a biometric profile including the passive user biometrics in association with the user credentials.

In another example, a computer device for enrolling a user in passive biometric identification, may include a processor and a memory in communication with the processor. The processor may be configured to provide an introductory experience upon activation of the device, wherein the introductory experience involves a user performing movements that allow collection of passive user biometrics by a sensor of the device. The processor may be configured to collect the passive user biometrics while the user performs the movements. The processor may be configured to calibrate the device for the user based on the movements. The processor may be configured to receive user credentials from the user. The processor may be configured to store a biometric profile including the passive user biometrics in association with the user credentials.

In another example, a computer-readable medium stores instructions executable by a processor of a computer device for enrolling a user in passive biometric identification. The computer-readable medium may include instructions to provide an introductory experience upon activation of the device, wherein the introductory experience involves a user performing movements that allow collection of passive user biometrics by a sensor of the device. The computer-readable medium may include instructions to collect the passive user biometrics while the user performs the movements. The computer-readable medium may include instructions to calibrate the device for the user based on the movements. The computer-readable medium may include instructions to receive user credentials from the user. The computer-readable medium may include instructions to store a biometric profile including the passive user biometrics in association with the user credentials.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIG. 2A is an example of an on-axis image of an eye.

FIG. 2B is an example of an off-axis image of an eye.

DETAILED DESCRIPTION

Figure 1:
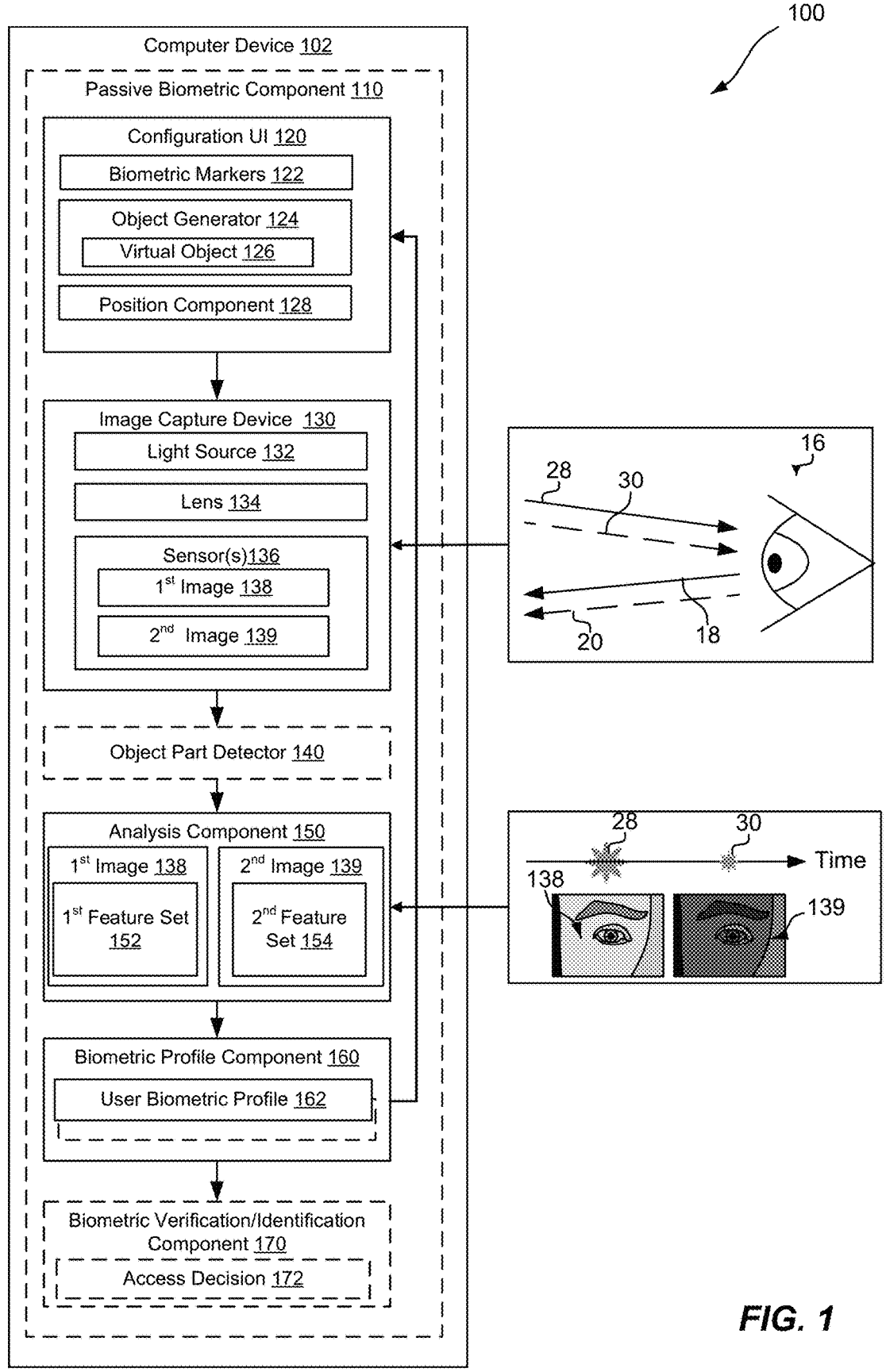
FIG. 1 is a schematic diagram of an example of a computer device in which features of the present disclosure may operate.

The apparatus and methods described herein relate to enrolling a user in a passive biometric identification system. The apparatus and methods provide an introductory out of box experience that collects a biometric profile using a passive biometric sensor. The biometric profile may be collected while the user configures the device for normal operation and/or calibrates one or more sensors of the device to be used in operation of the device. In an implementation, the apparatus and methods provide a user interface that directs a user to perform movements that allow collection of passive biometrics during the configuration and calibration process. The directions may not reference the passive biometric sensor, and the user may be unaware of the ongoing collection of biometric data. The user may be prompted to provide consent to the storage of the collected biometric profile.

In an implementation, the user interface directs the user's movement by including virtual objects in locations that require movement of the user to view or engage. For example, in a handheld device, a virtual object with which the user is to interact (e.g., a selectable checkbox) may be positioned or moved along an edge of a screen to direct the user's eyes in a particular direction relative to a passive biometric sensor. The passive biometric sensor may obtain a biometric reading at the time of the user's interaction with the virtual object. As another example, in a virtual reality or augmented reality device, the user may be asked to interact with a virtual object located to the side or behind the user. The passive biometric sensor may obtain a biometric reading as the user turns to interact with the virtual object. The device may calibrate movement sensors based on the movement occurring while the passive biometric sensor obtains the biometric reading.

Various examples are now described in more detail with reference to the FIGS. 1-6. In the following description, for purposes of explanation, numerous specific details are set forth in order to provide a thorough understanding of one or more examples. It may be evident, however, that such examples may be practiced without these specific details. Additionally, it should be noted that the term "component" as used herein may be one of the parts that make up a system, may be hardware, firmware, and/or software stored on a computer-readable medium and executable by a processor, and may be divided into other components.

Moreover, the examples described herein are not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples Referring to FIG. 1, a biometric identification system 100 includes a computer device 102 having a passive biometric component 110 configured to enroll a user in passive biometric identification using a configuration user interface (UI) 120 to collect a set of biometric markers 122. Enrolling the user in passive biometric identification may include collecting a biometric profile and storing the biometric profile in association with user credentials such that the user credentials may be accessed by the user providing a biometric object matching the biometric profile. For example, a user may enroll a biometric profile of the user's iris to allow the computer device 102 to be unlocked by recognizing the user's iris. More specifically, in order to enroll the user in passive biometric identification, the configuration UI 120 may control an object generator 124 to generate virtual objects 126 with which a user interacts during an out of box experience for the computer device 102 The configuration UI 120 may control a position component 128 to determine a position of the virtual objects 126 based on the biometric markers 122. The position may be a spatial positioned defined according to a coordinate system of the computer device 102. For example, a computer device 102 having a two-dimensional screen may define the position as x and y coordinates, while a computer device 102 providing a virtual reality experience may define the position using three dimensional coordinates.

The passive biometric component 110 may include an image capture device 130 that captures one or more images 138, 139 of a user. For example, the image capture device 130 may capture an image of the user's eye for iris recognition or another facial feature for scoped facial recognition. The image capture device 130 may include a controller configured to operate one or more components for capturing varying images. For example, the image capture device 130 may control light sources 132 to generate and direct first and second incident light 28, 30 toward biometric object 16. Biometric object 16 may include one or more of any type of living tissue of the user that can be passively captured in an image, such as but not limited to an eye, an iris, sclera, skin, a face or part thereof, a fingerprint, or any other type of living tissue object. The image capture device 130 may control lens 134 to adjust a focal length for capturing an image. The image capture device 130 may also operate one or more sensors 136 to capture the corresponding first and second reflected light 18, 20, respectively, correspondingly reflected off the biometric object 16. In response, sensor(s) 136 may convert the received first and second reflected light 18, 20 respectively into first image 138 and second image 139 of biometric object 16 for use in generating user biometric profiles 162 and performing verification/identification of biometric object 16.

Light source(s) 132 may be any type of device capable of generating any wavelength of light, such as but not limited to a light emitting diode (LED), an electroluminescent panel (ELP), and/or a light bulb. In one implementation, although any wavelength of light can be used, the apparatus and methods of the present disclosure utilize light source(s) 132 configured to generate infrared (IR) light in order to utilize light sources and corresponding sensor that may already be utilized for biometric verification/identification, thereby reducing the need for extra components. For example, but not to be construed as limiting, the IR light having wavelengths in the range of about 700 nanometers (nm) to 1000 nm, or more preferably in the range of about 800 nm to 1000 nm, or more preferably in the range of about 800 nm to 900 nm. Also, for example, visible light having wavelengths in the range of about 400 nm to 700 nm may be utilized. It should be understood that the above example wavelengths are merely examples, and the present disclosure allows for any wavelength to be used, e.g., no matter what wavelength is being used for biometric identification or verification. In an implementation, the apparatus and methods of this disclosure can change the intensity of the light source(s) to understand the details of the reflected medium generate a more detailed user biometric profile 162. Sensor(s) 136 may by any type of device capable of receiving light waves and/or electromagnetic radiation and converting them into an image. Suitable examples of sensor(s) 136 include, but are not limited to, an image sensor, a charge-coupled devices (CCD), and/or an active pixel sensor in a complementary metal-oxide-semiconductor (CMOS) or N-type metal-oxide-semiconductor (NMOS, Live MOS) technology.

More specifically, image capture device 130 may control light source(s) 132 to generate and emit one or more sets of first and second incident light 28, 30 at different times and at a same (or substantially similar) wavelength, but with different illumination characteristics in order to provide different biometric markers 122 for a user. In some instances, only a single set of first and second images 138, 139 may be utilized, while in other cases multiple images may be utilized in order to establish a complete biometric profile for a user. In some cases, the apparatus and methods described herein may utilize a relatively high frame rate in order to avoid or minimize movement of parts of biometric object 16 between first image 138 and second image 36 and/or any subsequent images. In other cases, the high frame rate may be used to obtain multiple images while the biometric object moves. This enables identification of different parts of biometric object 16 based on the position of the biometric object 16.

Computer device 102 may further include an analysis component 150 in communication with sensor(s) 136 to receive at least first and second images 138, 139 and respectively identify a first feature set 152 of one or more portions of first image 138 and a corresponding second feature set 154 of a corresponding one or more portions of second image 139. In particular, the features in the first feature set 152 and the second feature set 154 may relate to one another and to the biometric markers 122. For example, the first feature set 152 may include on-axis parameters and the second feature set 154 may include off-axis parameters. The first feature set 152 and the second feature set 154 may be, for example, any characteristic or metric that can be used to define a specific measure or representation of the biometric object 16 for comparison with other samples. Optionally, in yet another example, the first feature set 152 and second feature set 154 may include respective features that each correspond to a different part or region or pixel of the first and second images 138, 139 of biometric object 16. In other words, in an example related to an eye, the first feature set 152 may include different features/values/characteristics/ metrics for different eye parts in first image 138, and the second feature set 154 may include different reflection intensity features for the corresponding eye parts in second image 139.

In an optional implementation, computer device 102 may also include an object part detector component 140 having shape or pattern detecting functionality, such as shape recognition logic, operable to identify different parts of one or more different types of biometric object 16. In the example of biometric object 16 being an eye, for instance, object part detector component 140 may detect one or more eye-parts in each of first and second images 138, 139 (and any subsequent images). For example, the one or more eye-parts may include, but are not limited to, a single one or multiple ones or regions of one or more of a pupil, an iris, a sclera, and a periocular region (e.g., skin around the eye, such as an eyelid or the skin below or at the sides off the eye). In some cases, object part detector component 140 may be configured detect and identify a respective eye-part in a relatively higher illuminated (e.g., higher signal-to-noise ratio) one of first and second images 138, 139, and then overlay the other, relatively lower illuminated (e.g., lower signal-to-noise ratio) one of first and second images 138, 139 in order to identify the corresponding eye-part. Such overlaying may be utilized to save time and/or processing resources, and/or because as identifying shapes or patterns matching to eye-parts may be difficult in an under-illuminated (e.g., lower signal-to-noise ratio) image. Moreover, such overlaying has a higher likelihood to be accurate when first and second images 138, 139 are obtained with a sufficient frame rate to reduce movement of respective parts of biometric object 16. Although illustrated as being an independent component, it should be noted that object part detector component 140 may be a part of analysis component 150.

Computer device 102 additionally includes a biometric profile component 160 configured to generate a user biometric profile 162. For example, the biometric profile component 160 may classify features of the first feature set 152 and the second feature set 154 to generate the user biometric profile 162, to be used in future comparison to images of the user. For example, the features may correspond to the biometric markers 122 targeted by the configuration UI. That is, as the configuration UI 120 provides the introductory experience and the user moves to interact with the configuration UI 120, the biometric profile component 160 may identify biometric markers 122 in the first feature set 152 and second feature set 154 and generate the user biometric profile 162 to include the obtained biometric markers. The biometric profile component 160 may also provide feedback to the configuration UI 120 indicating which biometric markers 122 have been successfully collected, or which biometric markers 122 are missing from a user biometric profile 162. Accordingly, the configuration UI 120 may adapt the introductory experience based on the feedback from the biometric profile component 160.

Optionally, computer device 102 may further include a biometric verification/identification component 170 configured to verify an identify of the user based on passive biometrics obtained by a scan of the biometric object 16 in comparison with stored user biometric profiles 162. Passive biometric component 110 may be used to control access to computer device 102, a feature thereof, or to another computer device. In some cases, the biometric verification/ identification component 170 may compare the characteristic/value/metric/etc. of one or more features to a corresponding one or more difference thresholds in order to determine whether a features matches the user biometric profile 162. For example, each of the one or more thresholds for one or more biometric objects 16, or parts thereof, may be based on historical and/or tested data. Further, each of the one or more difference thresholds for one or more biometric objects 16 may be stored in user biometric profile 162 or on computer device 102. In other cases, biometric verification/ identification component 170 may include machine learning or artificial intelligence, e.g., one or more algorithms that can learn from and make predictions on data, where such algorithms overcome following strictly static program instructions by making data-driven predictions or decisions through building a model from sample inputs. As such, biometric verification/identification component 170 including machine learning or artificial intelligence can make biometric object classification decisions based off of a comparison of the biometric profile comparison relative to other biometric object classification decisions.

In a further option, biometric verification/identification component 170, which may be triggered to make an access decision 172 to allow or deny access to computer device 102 when biometric verification/identification component 170 confirms that the presented biometric object 16 corresponds to a stored user biometric profile 162. In some cases, biometric verification/identification component 170 may utilize image capture device 130, including the same or a subset of light source(s) 132, lens 134, and sensor(s) 136 to acquire user verification/identification information. As such, computer device 102 may avoid having different image capture equipment, thereby saving, for example, cost, efficiency, and weight. Biometric verification/identification component 170 may include a biometric identification function that compares the acquired user identification information to user biometric profile 162, e.g., the user biometric profile 162 generated during the passive biometric enrollment, in order to make access decision 172.

Referring now to FIGS. 2A and 2B, in an implementation, the biometric markers 122 may include features extracted from an on-axis image 210 and an off-axis image 220. For example, FIG. 2A illustrates an on-axis image of an eyeball 216, which may be an example of a biometric object 16 that may be used for iris recognition. As illustrated, in the on-axis image 210, the pupil 202 may be centered on a vertical axis 212 and a horizontal axis 214 of the image capture device 130. The object part detector component 140 may identify the pupil 202, the iris 204, and the sclera 206 in the on-axis image 210. The analysis component 150 may extract a first feature set 152 from the on-axis image 210, which may be an example of a first image 138.

In the off-axis image 220 of FIG. 2B, the pupil 202 may not be aligned with one or both axes 212, 214. For example, as illustrated, the pupil 202 may be aligned with the horizontal axis 214, but not the vertical axis 212. Accordingly, the off-axis image may include different features of the eyeball 216. For example, the off-axis image may provide a more direct view of the edge of the iris. Once again, the object part detector component 140 may identify the pupil 202, the iris 204, and the sclera 206 in the off-axis image 220 and the analysis component 150 may extract a second feature set 154 from the on-axis image 210, which may be an example of a second image 139. The feature sets may be combined by the biometric profile component 160 to generate the user biometric profile 162.

Figure 3:
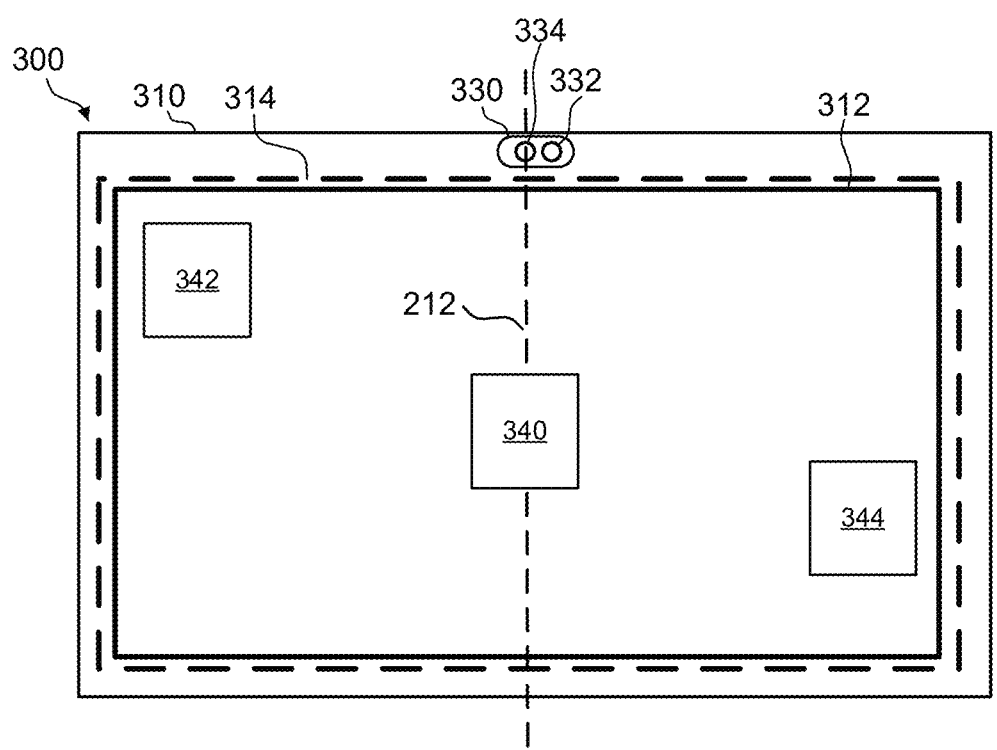
FIG. 3 is a front view of an example tablet computer device with a user interface for passive biometric collection.

FIG. 3 is a conceptual diagram showing use of passive biometric keystones to collect passive biometric measurements on an example device 300. The device 300 is an example of the computer device 102 and may be a tablet computer or another hand-held device. The device 300 may include a body 310, a display 312, and a digitizer 314. In an implementation, the display 312 and the digitizer 314 may be combined as a touch screen display. The device 300 may also include an image capture device 330, which may be an example of the image capture device 130. For example, the image capture device 330 may include a light source 332 (corresponding to light source 132) and a sensor 334 (corresponding to sensor 134).

The device 300 may present a user interface (e.g., generated by configuration UI 120) that provides an introductory experience upon activation of the device 300. For example, the user interface may be displayed on the display 312 and receive input via the digitizer 314. The introductory experience may include generation and display of virtual objects 340, 342, 344 (e.g., corresponding to virtual object 126). The virtual objects 340, 342, 344 may be positioned to cause the user to perform movements that allow collection of passive user biometrics the sensor 334. For example, the sensor 334 may obtain an on-axis image 210 when the user is interacting with the virtual object 340 aligned with the vertical axis 212 of sensor 334. Accordingly, the user interface may position the virtual object 340 in alignment with the vertical axis 212 and control the image capture device 130 to obtain an image. In an implementation, the image may be obtained when the user interacts with the virtual object 340, for example, by touching the digitizer 314 at the virtual object 340. As another example, the user interface may position the virtual object 342 near an edge of the display 312 to obtain an off-axis image 220. In an implementation, it may be desirable to capture an off-axis image 220 by moving the virtual object 342 towards the edge of the display 312 while the user is interacting with the virtual object 342. Accordingly, the user's eyes are likely to follow the moving virtual object 342 rather than the user turning his or her head or moving the device 300. The virtual object 344 may be used to obtain a different off-axis image with the eye pointed in an opposite direction.

It should be appreciated that the user interface may not provide an explicit instruction for the user to position his or her eyeball in a particular orientation, as such an instruction may be awkward for passive biometrics. Instead, the position of the virtual objects 340, 342, 344 may be selected during normal usage of the virtual objects. For example, the virtual object 342 may be a checkbox or link that the user touches to advance an introductory experience.

Figure 4:
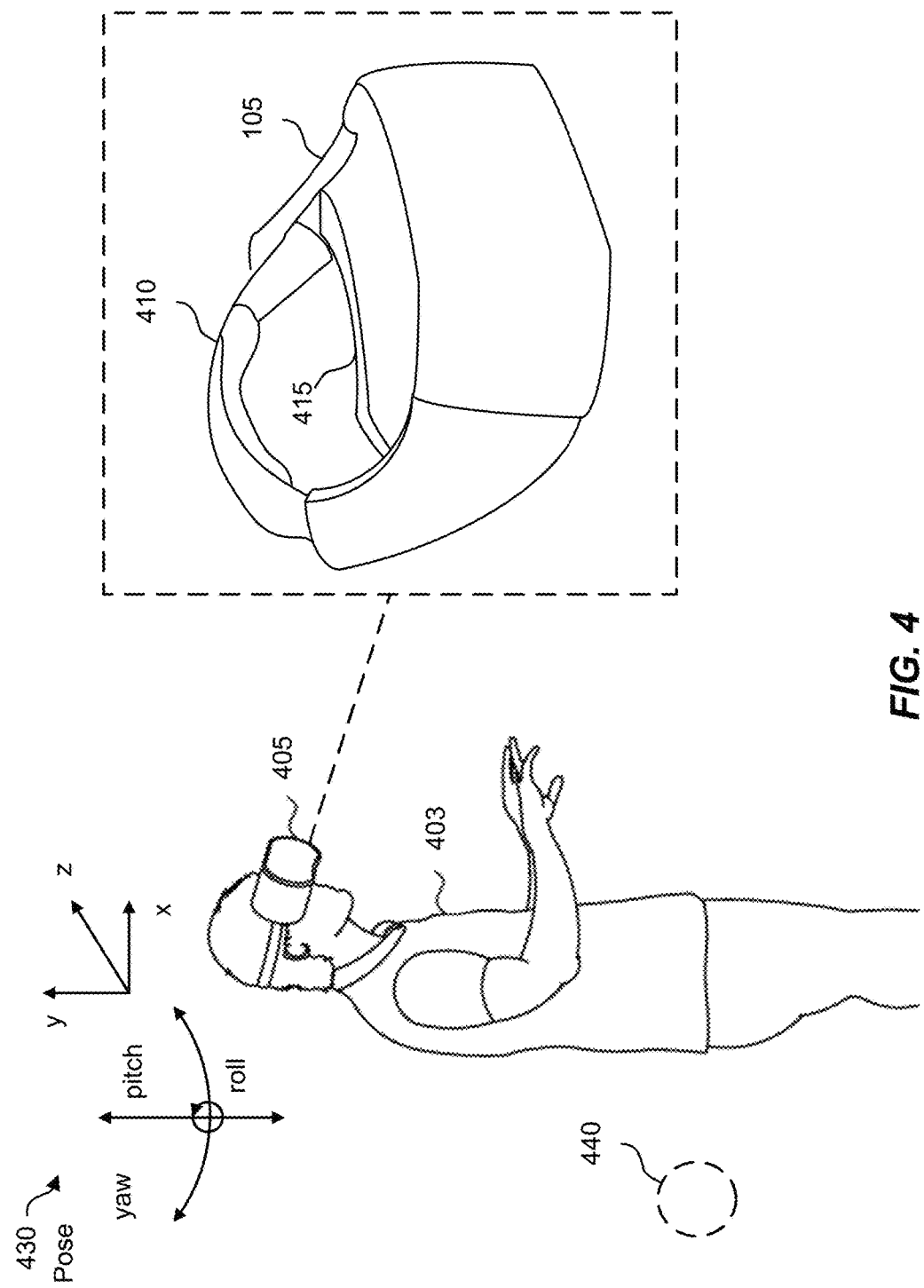
FIG. 4 is an example of a head mounted display device that may be used for passive biometric collection.

Referring now to FIG. 4, an example system 400 for use in connection with passive biometric identification in a virtual reality (VR) or augmented reality (AR) scenario includes a computer device 102 (FIG. 1) in communication with one or more display devices 405. Computer device 102 may communicate image data for displaying VR images on display device 405. Display device 405 may include, for example, a head mounted display (HMD) 405.

The HMD 405 may be configured to provide virtual reality images (e.g., from at least one virtual environment input), mixed reality (MR) images (e.g., from at least two virtual environment inputs), and/or augmented reality (AR) images (e.g., from at least one virtual environment input and one real environment input). The HMD 405 comprises a headpiece 410, which may be a headband, arranged to be worn on the head of user 403. It should be appreciated by those of ordinary skill in the art that the HMD 405 may also be attached to the user's head using a frame (in the manner of conventional spectacles), helmet, or other fit system. The purpose of the fit system is to support the display and provide stability to the display and other head-borne systems such as tracking systems, sensors, and cameras.

The HMD 405 may include optical components 415 (e.g., one or more lenses), including waveguides that may allow the HMD 405 to project images generated by a light engine included within (or external) to the HMD 405. The optical components 415 may use plate-shaped (usually planar) waveguides for transmitting angular image information to users' eyes as virtual images from image sources located out of the user's line of sight. The image information may propagate along the waveguides as a plurality of angularly related beams that are internally reflected along the waveguide. Diffractive optics are often used for injecting the image information into the waveguides through a first range of incidence angles that are internally reflected by the waveguides as well as for ejecting the image information through a corresponding range of lower incidence angles for relaying or otherwise forming an exit pupil behind the waveguides in a position that can be aligned with the users' eyes. Both the waveguides and the diffractive optics at the output end of the waveguides may be at least partially transparent so that the user can also view the real environment through the waveguides, such as when the image information is not being conveyed by the waveguides or when the image information does not fill the entire field of view.

The light engine (not shown), which may project images to be displayed on the optical components 415, may comprise a light source (e.g., a laser), a micro display and imaging optics in the form of a collimating lens. The micro display can be any type of image source, such as liquid crystal on silicon (LCoS) displays, liquid crystal displays (LCD), matrix arrays of LED's (whether organic or inorganic) and any other suitable display. The optical components 415 may focus a user's vision on one or more portions of one or more display panels. The display panels may display one or more images (e.g., left eye image and right eye image) based on signals received from the light engine. Thus, the optics may include left eye optics for focusing the user's left eye on the left eye image and right eye optics for focusing the user's right eye on the right eye image. For example, the optical components 415 may focus the user's eyes on a central portion of each of the left eye image and the right eye image. The user's brain may combine the images viewed by each eye to create the perception that the user is viewing a 3D environment.

In an implementation, the HMD 405 may also include a frame or slot (not shown) for coupling a smart-phone or other portable computing device to the HMD 405 in a way that exposes the display screen of the smartphone to the optical components 415. The HMD 405 may transition between AR and VR scenarios by causing the optical members to either pass light or block light, thereby either showing or hiding view of the real world while presenting virtual content to the user.

The image data may be modified or adjusted based on user input (e.g., movement of user's head position when the display device 405 is a HMD). To that end, the display device 405 may capture and communicate a head position (i.e., pose 430) of a user wearing display device 405 to computer device 402. The pose 430 of a user may be determined from head motion input received from HMD tracking information (e.g., a position and/or orientation of the HMD 405). For example, the pose may include spatial x, y, and z coordinates as well as yaw, pitch, and roll.

In an implementation, the configuration UI 120 may provide an introductory experience that orients the user 403 to the display device 405 and concepts of VR, MR, and AR. For example, the user 403 may need to learn how to move in a virtual world. The computer device 102 may also need to calibrate various sensors of the display device 405 for the specific user. For example, changes in the pose 430 may vary based in part on the size of the user 403. The introductory experience may include events that involve the user 403 moving to interact with a virtual object 440, which may be an example of the virtual object 126. For example, the configuration UI 120 may position the virtual object 440 behind the user 403 to direct the user 403 to turn around. The passive biometric component 110 may control the image capture device 130 to capture an image of the user 403 while the user is performing such a movement. For example, the user may look to a side while performing a movement and the image capture device 130 may capture an off-axis image. In an implementation, the virtual object 440 may be a hologram that moves as the user 403 provides other configuration information. The image capture device 130 may collect various biometric markers 122 as the user follows the virtual object 440.

Figure 5:
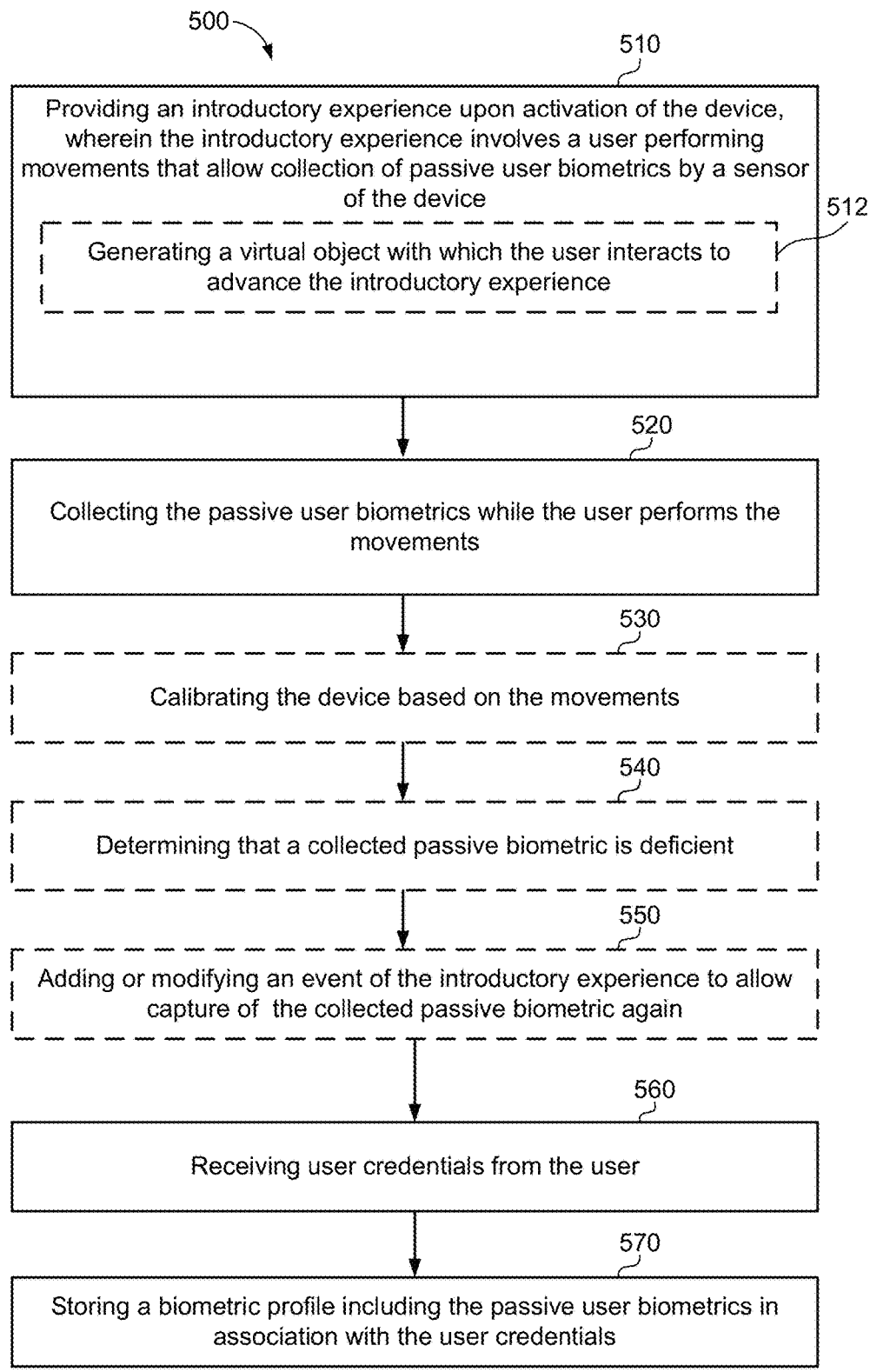
FIG. 5 is a flow chart of a method of passive biometric enrollment, which may be implemented on the computer device of FIG. 1 in accordance with the present disclosure.

Referring to FIG. 5, an example method 500 of biometric enrollment is described. The method 500 may be performed by computer device 102 and/or its sub-components as described with reference to FIG. 1. Although the method 500 is described below with respect to the elements of computer device 102, other components may be used to implement one or more of the steps described herein.

At block 510, the method 500 may include providing an introductory experience upon activation of the device, wherein the introductory experience involves a user performing movements that allow collection of passive user biometrics by a sensor of the device. For example, configuration UI 120 may provide an introductory experience upon activation of the computer device 102. The introductory experience may involve a user performing movements that allow collection of passive user biometrics by a sensor 136 of the device. For example, at block 512, the block 510 may include generating a virtual object 340, 342, 344, with which the user interacts to advance the introductory experience. The position component 128 may position the virtual object 340, 342, 344 relative to the sensor 136 based on a missing biometric marker 122 for a user biometric profile 162.

At block 520, the method 500 may include collecting the passive user biometrics while the user performs the movements. For example, the sensor 136 may collect the passive user biometrics while the user performs the movements. The sensor 136 may capture a first image 138, and the analysis component 150 may extract a first feature set 152 of passive user biometrics from the first image. The first image 138 may be an image of an eye of the user for the case of iris recognition. The first image 138 may be an image of at least a portion of a face of the user in the case of facial recognition.

At block 530, the method 500 may optionally include calibrating the device based on the movements. In an implementation, for example, the configuration UI 120 may calibrate the computer device 102 based on the movements. For example, the movement may include interaction with a virtual object to select a configuration option. The configuration UI may receive the selected configuration from the user and configure the computer device 102 based on the selected configuration option. In another example, for example using the HMD 405, the movement may be detected by one or more sensors that are different than the sensor 136 capturing the passive biometric. For example, the HMD 405 may capture pose 430 or head movement for calibrating rendering of a virtual world to correspond to movement of the user.

At block 540, the method 500 may optionally include determining that a collected passive biometric is deficient. For example, the analysis component 150 may determine that the collected passive biometric is deficient when the extracted first feature set 152 does not include a desired biometric marker 122. For instance, the user may have blinked as the first image 138 was captured and the desired biometric marker 122 may not be present in the first image 138.

At block 550, the method 500 may optionally include adding or modifying an event of the introductory experience to allow capture of the collected passive biometric again. The block 550 may be in response to the block 540. In an implementation, the configuration UI 120 may generate another virtual object 126 for the user to interact with and control the position of the virtual object 126 based on the deficient passive biometric. In an implementation, the virtual object 126 may be for a previously planned event of the introductory experience and the position of the virtual object may be changed to allow collection of the passive biometric.

At block 560, the method 500 may include receiving user credentials from the user. The user credentials may be access credentials for the user to access the computer device 102, or a particular feature thereof (e.g., a user account). The configuration UI 120 may obtain consent of the user to use passive biometrics when receiving the user credentials, for example by displaying information regarding the collected passive biometrics and an input field by which the user provides consent.

At block 570, the method 500 may include storing a biometric profile including the passive user biometrics in association with the user credentials. For example, the biometric profile component 160 may store the user biometric profile 162 including the passive user biometrics (e.g., first feature set 152) in association with the received user credentials. The user biometric profile 162 may be linked to the user credentials such that when the user provides the biometric object 16, the biometric verification/identification component 170 may identify the user and access the user credentials to make the access decision 172.

Figure 6:
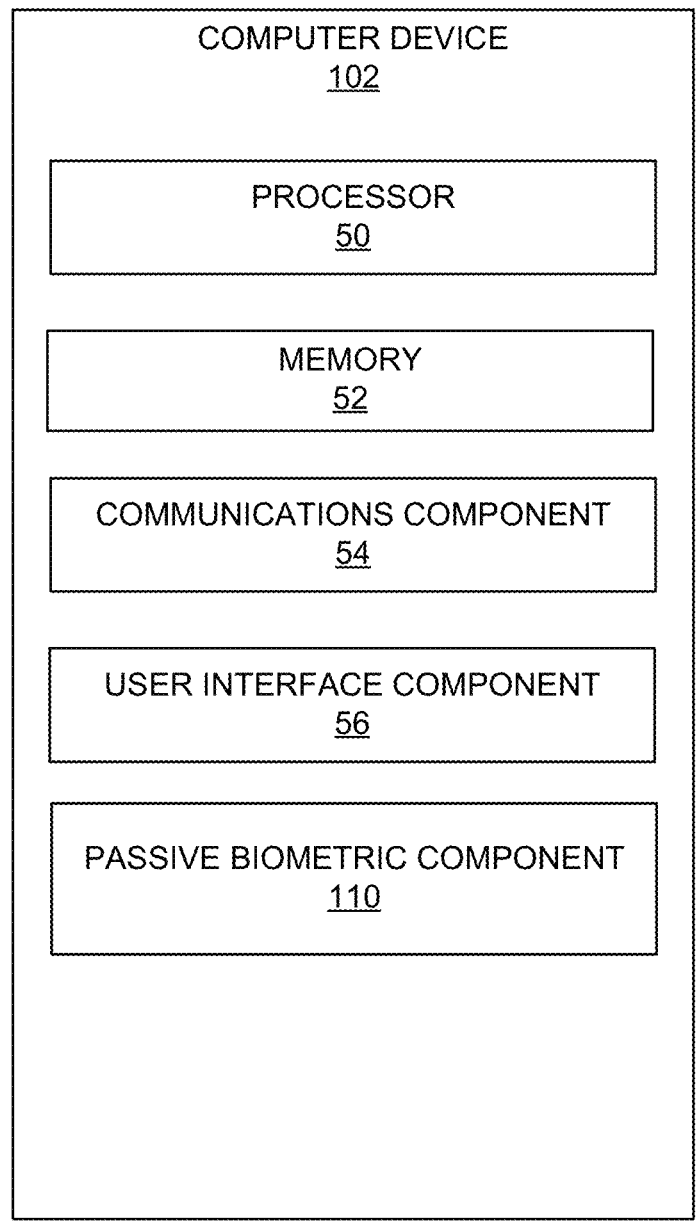
FIG. 6 is a block diagram of an additional example of the computer device of FIG. 1, including additional components, in accordance with the present disclosure.

Referring now to FIG. 6, a more detailed example of computer device 102 includes additional components that may be utilized to implement the functionality described herein. In some examples, computer device 102 may include a processor 50 for executing passive biometric component 110 for carrying out one or more functions (e.g., method 500) described herein. The processor 50 may include a single or multiple set of processors or multi-core processors. Moreover, the processor 50 can be implemented as an integrated processing system and/or a distributed processing system.

Computer device 102 may further include memory 52, such as for storing local versions of applications being executed by the processor 50, such as an application defining passive biometric component 110 and/or an application (e.g., a gaming application, a social interfacing application, etc.) that may accessed based on operation of passive biometric component 110. In some aspects, the memory 52 may be implemented as a single memory or partitioned memory. In some examples, the operations of the memory 52 may be managed by the processor 50. Memory 52 can include a type of memory usable by a computer, such as random access memory (RAM), read only memory (ROM), tapes, magnetic discs, optical discs, volatile memory, non-volatile memory, and any combination thereof. Additionally, the processor 50 and memory 52 may include and execute an operating system that performs the functionality of passive biometric component 110 and/or method 500.

Further, computer device 102 may include a communications component 54 that provides for establishing and maintaining communications with one or more parties utilizing hardware, software, and services as described herein. Communications component 54 may carry communications between components on computer device 102, as well as between computer device 102 and external devices, such as to electronic devices coupled, e.g., via a wired or wireless link, locally to computer device 102 and/or located across a communications network. For example, communications component 54 may include one or more buses operable for interfacing with internal components and one or more interfaces for interfacing with external devices.

Computer device 102 may also include a user interface component 56 operable to receive inputs from a user of computer device 102 and further operable to generate outputs for presentation to the user. User interface component 56 may include one or more input devices, including but not limited to a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, any other mechanism capable of presenting an output to a user, or any combination thereof.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 102), which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in computer device 102. In the alternative, the processor and the storage medium may reside as discrete components in computer device 12. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method of enrolling user biometrics for a device, comprising:
   providing an introductory experience upon activation of the device, wherein the introductory experience involves a user performing movements that allow collection of passive user biometrics by a sensor of the device, wherein providing the introductory experience includes generating a virtual object with which the user interacts to advance the introductory experience, wherein the virtual object is positioned relative to the sensor based on a missing biometric marker for a biometric profile;
   collecting the passive user biometrics while the user performs the movements;
   calibrating the device based on the movements;
   receiving user credentials from the user; and
   storing the biometric profile including the passive user biometrics in association with the user credentials.

2. The method of claim 1, wherein the virtual object is a hologram.

3. The method of claim 1, wherein collecting passive user biometrics comprises obtaining an image of an eye of the user.

4. The method of claim 1, wherein collecting user biometrics comprises obtaining an image of at least a portion of a face of the user.

5. The method of claim 1, further comprising:
   determining that a collected passive biometric is deficient; and
   adding or modifying an even of the introductory experience to allow capture of the collected passive biometric again.

6. A computer device for enrolling a user in passive biometric identification, comprising:
   a processor;
   a memory in communication with the processor;
   wherein the processor is configured to:
      provide an introductory experience upon activation of the device, wherein the introductory experience involves a user performing movements that allow collection of passive user biometrics by a sensor of the device, wherein the introductory experience includes a virtual object with which the user interacts to advance the introductory experience, wherein the virtual object is positioned relative to the sensor based on a missing biometric marker for a biometric profile;
      collect the passive user biometrics while the user performs the movements;

calibrate the device for the user based on the movements;

receive user credentials from the user; and store the biometric profile including the passive user biometrics in association with the user credentials.

7. The computer device of claim 6, wherein the virtual object is a hologram.

8. The computer device of claim 6, further comprising an image capture device configured to obtain an image of an eye of the user.

9. The computer device of claim 6, further comprising an image capture device configured to obtain an image of at least a portion of a face of the user.

10. The computer device, of claim 6, wherein the processor is configured to:

determine that a collected passive biometric is deficient; and add or modify an event of the introductory experience to allow capture of the collected passive biometric again.

11. A non-transitory computer-readable medium storing instructions executable by a processor for enrolling a user in passive biometric identification, comprising instructions to:

provide an introductory experience upon activation of a device, wherein the introductory experience involves a user performing movements that allow collection of passive user biometrics by a sensor of the device;

generate a virtual object with which the user interacts to advance the introductory experience;

position the virtual object relative to the sensor based on a missing biometric marker for a biometric profile;

collect the passive user biometrics while the user performs the movements;

calibrate the device for the user based on the movements;

receive user credentials from the user; and store a biometric profile including the passive user biometrics in association with the user credentials.

12. The non-transitory computer-readable medium of claim 11, wherein the virtual object is a hologram.

13. The non-transitory computer-readable medium of claim 11, further comprising instructions to control an image capture device to obtain an image of an eye of the user or at least a portion of a face of the user.

14. The non-transitory computer-readable medium of claim 11, further comprising instructions to:

determine that a collected passive biometric is deficient; and add or modify an event of the introductory experience to allow capture of the collected passive biometric again.

* * * * *